US012385288B2

(12) United States Patent
Mani et al.

(10) Patent No.: US 12,385,288 B2
(45) Date of Patent: Aug. 12, 2025

(54) SIMPLIFIED LEVER HANDING APPARATUS

(71) Applicant: Schlage Lock Company LLC, Carmel, IN (US)

(72) Inventors: Vijayakumar Mani, Bangalore (IN); Saagar Mohammed, Alappuzha (IN); Prem Ratan Mohan Ram, Bangalore (IN); James D. Ohl, Colorado Springs, CO (US); Daniel J. Compton, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 1035 days.

(21) Appl. No.: 17/210,022

(22) Filed: Mar. 23, 2021

(65) Prior Publication Data

US 2022/0042350 A1 Feb. 10, 2022

Related U.S. Application Data

(60) Continuation of application No. 15/730,938, filed on Oct. 12, 2017, now Pat. No. 10,954,694, which is a
(Continued)

(51) Int. Cl.

| | |
|---|---|
| ***E05B 63/04*** | (2006.01) |
| ***E05B 3/06*** | (2006.01) |
| *E05B 47/00* | (2006.01) |

(52) U.S. Cl.

CPC .............. *E05B 63/04* (2013.01); *E05B 3/065* (2013.01); *E05B 2047/0058* (2013.01); *Y10T 292/57* (2015.04)

(58) Field of Classification Search

CPC .... E05B 63/0056; E05B 63/04; E05B 63/042; E05B 3/00; E05B 3/003; E05B 3/06; E05B 3/065; E05B 1/00; E05B 1/003; E05B 1/0092; E05B 1/0007; E05B 1/0053; E05B 2001/0076; E05B 15/00; Y10T 292/57; Y10T 292/82; Y10T 292/85; Y10T 292/854; Y10T 292/869; Y10T 292/873;
(Continued)

(56) References Cited

U.S. PATENT DOCUMENTS

| | | | |
|---|---|---|---|
| 2,553,639 | A | 5/1951 | Dey |
| 4,884,835 | A | 12/1989 | Smallegan et al. |

(Continued)

FOREIGN PATENT DOCUMENTS

| | | | | |
|---|---|---|---|---|
| DE | 4231123 | A1 * | 3/1994 | ......... E05B 15/0053 |
| EP | 1703044 | A2 * | 9/2006 | ............. E05B 3/065 |

(Continued)

*Primary Examiner* — Alyson M Merlino

(74) *Attorney, Agent, or Firm* — Taft Stettinius & Hollister LLP

(57) ABSTRACT

The present disclosure defines a lever handing apparatus that permits simplified changing of the handing of a lever handle between a left hand and a right hand orientation. The lever handing apparatus includes an assembly with a rotatable spring cage housing and lever spindle that can be selectively rotated within an escutcheon housing to change the handing position of a lever arm. The handing orientation of the lever can be repositioned without removing a back plate or accessing internal components positioned within the escutcheon housing assembly.

19 Claims, 9 Drawing Sheets

Related U.S. Application Data division of application No. 14/189,228, filed on Feb. 25, 2014, now Pat. No. 9,790,713.

(58) Field of Classification Search

CPC . Y10T 292/876; Y10T 292/88; Y10T 292/91; Y10T 292/93; Y10T 292/96; Y10T 292/1097; Y10T 292/1098; Y10T 292/59; Y10T 70/5832; Y10T 70/8838; Y10T 70/8865; Y10S 292/52; Y10S 292/53; Y10S 292/60

See application file for complete search history.

(56) References Cited

U.S. PATENT DOCUMENTS

| | | | | |
|---|---|---|---|---|
| 5,085,474 | A | 2/1992 | Toledo et al. | |
| 5,322,333 | A | 6/1994 | Norton, II et al. | |
| 5,529,354 | A | 6/1996 | Studt et al. | |
| 7,152,891 | B2 | 12/2006 | Bergen et al. | |
| 7,178,373 | B2 | 2/2007 | Shen et al. | |
| 8,011,702 | B2 | 9/2011 | Tien et al. | |
| 9,127,484 | B2 * | 9/2015 | Mani | E05B 3/065 |
| 9,464,458 | B2 * | 10/2016 | Huang | E05B 1/003 |
| 2003/0189342 | A1 | 10/2003 | Chong et al. | |
| 2005/0127691 | A1 | 6/2005 | Shen | |
| 2005/0274163 | A1 | 12/2005 | Shen et al. | |
| 2006/0049644 | A1 | 3/2006 | Bergen et al. | |
| 2008/0252086 | A1 | 10/2008 | Houis | |
| 2009/0146439 | A1 * | 6/2009 | Watts | E05B 3/065 292/348 |
| 2013/0168978 | A1 | 7/2013 | Huang et al. | |
| 2014/0001772 | A1 | 1/2014 | Mani | |

FOREIGN PATENT DOCUMENTS

| | | | | | |
|---|---|---|---|---|---|
| JP | 04231566 | A | * | 8/1992 | |
| WO | WO-9744556 | A1 | * | 11/1997 | E05B 3/065 |
| WO | WO-2007045022 | A1 | * | 4/2007 | E05B 3/065 |

* cited by examiner

SIMPLIFIED LEVER HANDING APPARATUS

CROSS-REFERENCE TO RELATED APPLICATIONS

The present application is a continuation of U.S. patent application Ser. No. 15/730,938 filed Oct. 12, 2017 and issued as U.S. Pat. No. 10,954,694, which is a divisional of U.S. patent application Ser. No. 14/189,228 filed Feb. 25, 2014 and issued as U.S. Pat. No. 9,790,713, the contents of each application hereby incorporated by reference in their entirety.

TECHNICAL FIELD

The present disclosure generally relates to a lever handing apparatus for a lever handle connected to a lock and escutcheon assembly, and more specifically to a lever handing apparatus configured to permit selectively pivoting of the lever handle for operation with either a left handed or right handed opening door.

BACKGROUND

Lever handles for lock and escutcheon assemblies can be repositionable approximately 180 degrees apart depending on whether the handle will be used on a door that opens from the left hand side or a door that opens from the right hand side. Typically lever handles are changed between right hand and left hand orientations by removing and reorienting portions of a handle assembly and/or opening the escutcheon trim assembly to gain access to adjustable internal components. This can be both time consuming and cumbersome for the lock installer. Accordingly there remains a need for further contributions in this area of technology.

SUMMARY

One embodiment of the present disclosure includes a lever handing apparatus for changing the handing of a lever handle connected with a lock and escutcheon assembly to selectively operate with either right hand or left hand opening doors. Other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
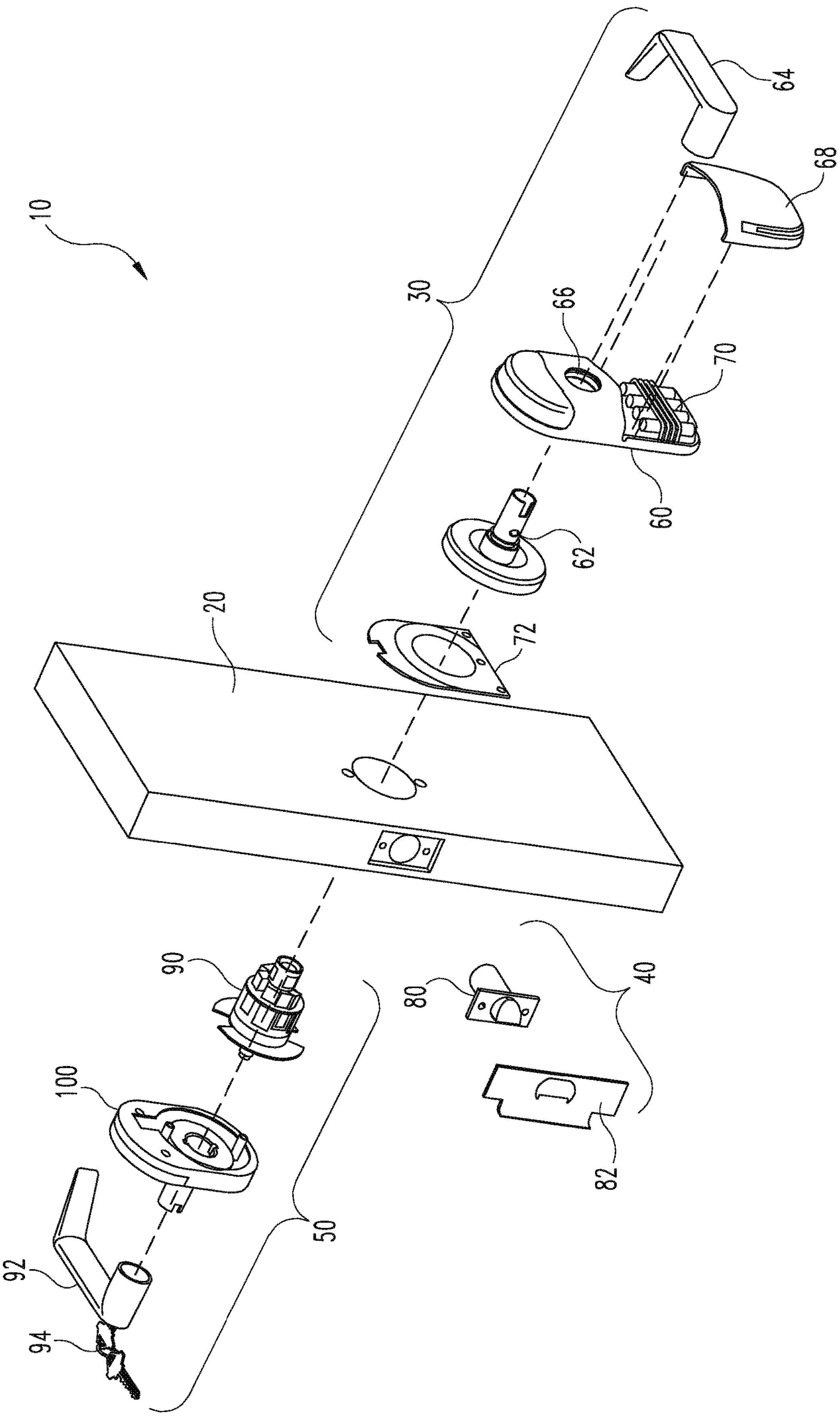
FIG. 1 is an exploded view of a lock and handle assembly according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a lock assembly 10 according to the present disclosure is illustrated therein. The lock assembly 10 can be configured for a door 20 or similar moveable structures that are selectively locked to fixed structures. The lock assembly 10 can include an inner trim assembly 30, a latch assembly 40, and an outer trim assembly 50. The inner trim assembly 30 can include an inner escutcheon housing 60 and an inner lever spindle 62 rotatably connected therewith. An inner lever or handle 64 can be connected to the inner lever spindle 62 extending through an aperture 66 formed through the inner escutcheon housing 60. A removable cover 68 can be employed to selectively cover electronic components such as batteries 70 and the like for electronic lock mechanisms. An inner back plate 72 can be releasably connected to the inner escutcheon housing 60 to hold the inner level spindle 62 and other components within the inner escutcheon housing 60. The latch assembly 40 can include one or more latches 80 and a latch plate 82 connected to fixed structure (not shown).

The outer trim assembly 50 can include a lock mechanism 90 that is operable to lock and unlock the door 20. An outer lever 92 can be connected to a lever handing apparatus 100 to permit handing changes for left and right handed opening door. The handing apparatus 100 can be operably connected to the locking mechanism 90, the latch assembly 40 and the inner trim assembly 30. The locking mechanism 90 can include mechanical locking mechanisms as well as electronic mechanisms including electronic controllers as is known to those skilled in the art. A manual override mechanism can include a key 94 to unlock the lock mechanism 10 as is conventional. Material selection for components in the lock assembly 10 can include metals, plastics, composites and combinations thereof to meet design criteria for a particular application.

Figure 2:
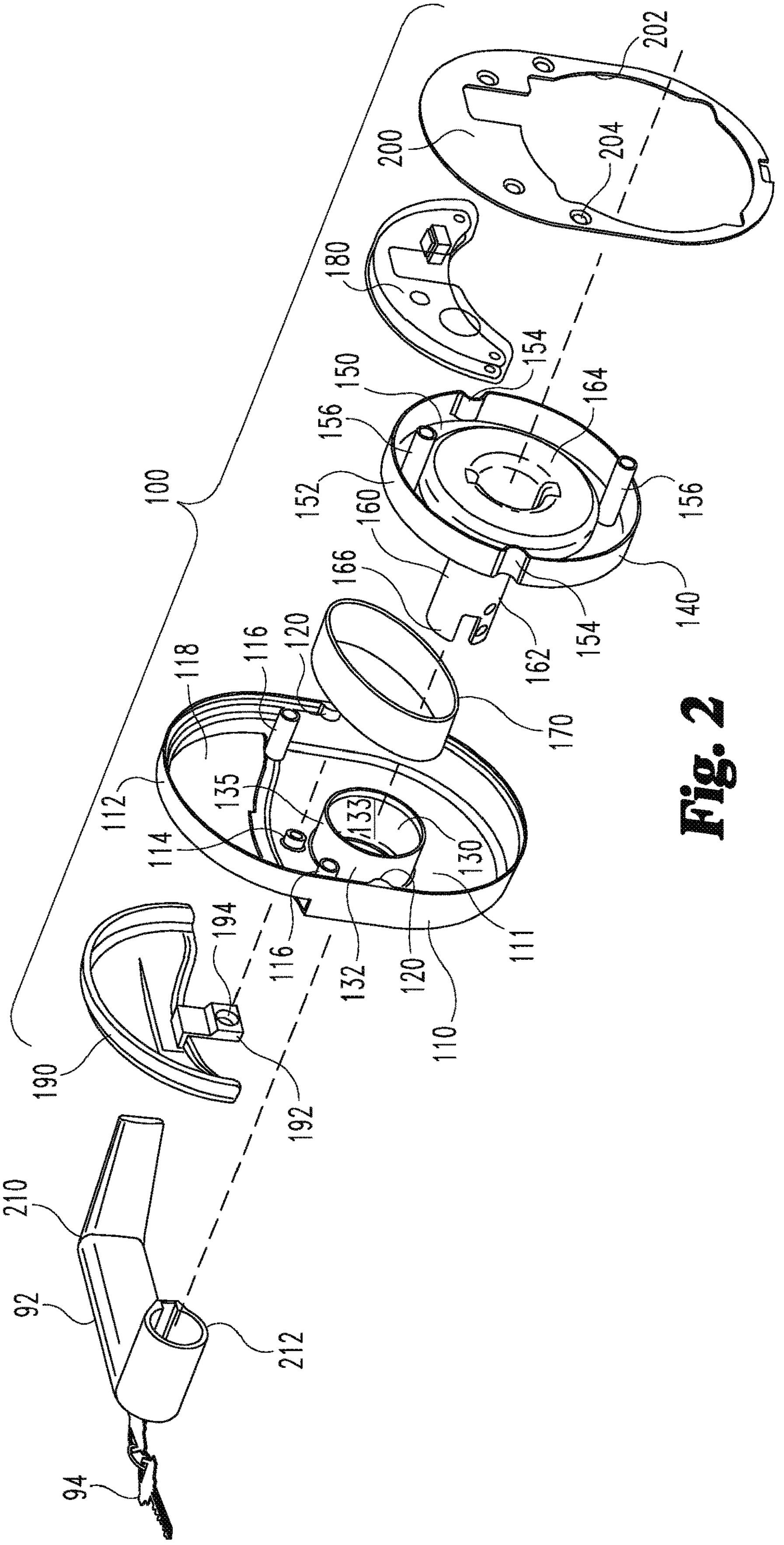
FIG. 2 is a perspective exploded view of a lever handing apparatus according to one embodiment of the present disclosure.

Referring now to FIG. 2, the lever handing apparatus 100 is shown in an exploded view. The lever handing apparatus 100 includes an outer escutcheon housing 110 that includes a front wall 111 extending to an outer rim 112 position substantially around the front wall 111. In the illustrative embodiment, the outer rim is formed in a substantially ovalized shape to correspond with a configuration of the escutcheon housing 110, however alternate shapes or configurations are also contemplated by the present disclosure.

The front wall 111 can include a threaded receiver 114 connected thereto to receive a threaded fastener (not shown). One or more threaded posts 116 can also be formed with or connected to the outer escutcheon housing 110. Both the threaded receiver 114 and the threaded posts 116 will be discussed in further detail below. A PCB (Printed Circuit Board) holding region 118 can be positioned within the outer escutcheon housing 110 in some embodiments having electronic lock mechanisms. In the other embodiments the lever handing apparatus 100 may not include a PCB holding region 118.

One or more abutments such as protruding portions or dimples 120 can be formed on the outer rim 112 of the escutcheon housing 110 that protrude radially inward from the outer rim 112 and can be positioned approximately 180 degrees apart from one another. The dimples or protrusions 120 are configured to permit selective change of orientation of the outer lever 92 between left hand and right hand opening doors. A spindle aperture 130 having a substantially circular shape can be formed through the front wall 111 of the outer escutcheon housing 110. The spindle aperture 130 can include a spindle support wall 132 having an inner surface and an outer surface 133, 135 respectively that extends inward from the front wall 111.

A spring cage housing 140 can include a spring cage wall 150 extending radially outward to a spring cage outer rim 152. The spring cage rim 152 can include one or more recessed portions 154 that are complementary with the one or more dimples 120 formed in the outer escutcheon housing 110. The recessed portions 154 of the spring cage rim 152 are complimentary to the dimples 120 of the outer escutcheon housing 110 in that a recessed portion 154 can be nested in a first axial position with a corresponding dimple 120 when each pair are circumferential alignment. In the first axial position, the dimple 120 will prevent the spring cage housing 140 from rotating relative to the outer escutcheon housing 110. When the recessed portion 154 is moved to a second axial position that is not axially aligned (i.e. un-nested) the spring cage housing 140 can be rotated relative to the outer escutcheon housing 110 and thus permit a change of orientation of the outer lever 92 as will be explained in more detail below.

The spring cage housing 140 can also include one or more optional posts 156 that extend from the spring cage wall 150. In some embodiments the optional posts 156 can be eliminated from the assembly. A lever spindle 160 can be rotatably coupled with the spring cage housing 140 such that in one configuration the lever spindle 160 and the spring cage housing 140 rotate together and in another configuration the lever spindle 160 can rotate independently of the spring cage housing 140. A shaft 162 extending from a body portion 164 of the lever spindle 160 can be inserted through an aperture 151 (see FIG. 3) formed through the spring cage wall 150 of the spring cage housing 140. The lever spindle shaft 162 includes a lever connecting portion 166 on one end thereof to connect with the outer lever 92 such that rotation of the outer lever 92 causes rotation of the lever spindle shaft 162. In one form the lever spindle 162 can be rotatably coupled to the spring cage housing 140 such that through mechanical connection the lever spindle 160 can freely rotate relative to the spring cage housing 140 when the coupled pair are in a first axial position and can rotate together when the coupled pair are in a second axial position.

A resilient member such as a handing spring 170 can be positioned about the spindle support wall 132 of the outer escutcheon housing 110 and can engage with the spring cage housing 140 so as to urge separation between the front wall 111 of the outer escutcheon housing 110 and the spring cage housing 140. The handing spring 170 can be defined by any resilient member or configuration as desired, such as leaf springs or others known to those skilled in the art, but in the exemplary embodiment a coil spring is depicted for illustrative purposes. The handing spring 170 is operable to urge the spring cage housing toward the first axial position such that the spring cage housing 140 is circumferentially locked (non-rotatable) with respect to the outer escutcheon housing 110.

A PCB assembly 180 that includes electronic circuits and components for electronic locks can be positioned within the PCB holding region 118 of the outer escutcheon housing 110. An RF (Radio Frequency) window cover 190 can be used to cover the PCB holding region 118 on one side of the outer escutcheon housing 110. The RF window is operable to permit RF signals to be transmitted from a transmitter such as a proximity card and the like through the RF window cover to a receiver (not illustrated) connected with the PCB assembly 180. The RF window cover 190 can include a connector tab 192 with a through hole 194 configured to engage with the threaded receiver 114 of the outer escutcheon housing 110. A threaded fastener (not shown) can be used to selectively couple the RF window cover 190 to the outer escutcheon housing 110 as is conventional.

A back plate 200 can be connected to the outer escutcheon housing 110 through one or more threaded fasteners, clips, or other mechanical connections that although not shown are well known to those skilled in the art. The back plate 200 is configured to enclose the spring cage housing 140, lever spindle 160, the handing spring 170 as well as other components within the outer escutcheon housing 110. The back plate 200 can include an opening with an inner boundary 202 in some embodiments to permit access to components enclosed by the outer escutcheon housing 110. In other embodiments the back plate 200 may be substantially or completely solid or have a different opening to that shown in FIG. 2. The back plate 200 can also include a plurality of through holes 204 to receive various fasteners, sliding pins or other mechanical features as will be discussed below.

The outer lever 92 can include a lever arm 210 that extends from a spindle receiving portion 212. The lever arm 210 can be generally oriented to extend in one direction for a left hand opening door and in the opposite direction approximately 180 degrees apart for a right hand opening door. In the illustrated configuration the lever arm 210 is pointed towards the left when viewing the apparatus from a forward looking aft position. The spindle receiving portion 212 can be configured to couple with the lever connecting portion 166 of the lever spindle 160. In one form, the spindle receiving portion 212 can be inserted around the lever spindle shaft 162 after the lever spindle 160 is positioned through the spindle aperture 130 of the outer escutcheon housing 110. Other forms of coupling the spindle receiving portion 212 of the outer lever 92 with the lever connecting portion 166 of the lever spindle 160 are contemplated by the present disclosure.

The spindle support wall 132 of the spindle aperture 130 in the outer escutcheon housing 110 is configured to support both axial movement and rotational movement of the shaft 162 of the lever spindle 160 such that the spring cage housing 140 can move in axial and rotational directions to implement a change in lever handing orientation as well as opening a latch 80. In some forms, the inner surface 133 can include a bearing surface to support the lever spindle 160 and spring cage housing 140. In other embodiments the outer surface 135 of the spindle support wall 132 can include a bearing surface to support the spring cage housing 140.

Figure 3:
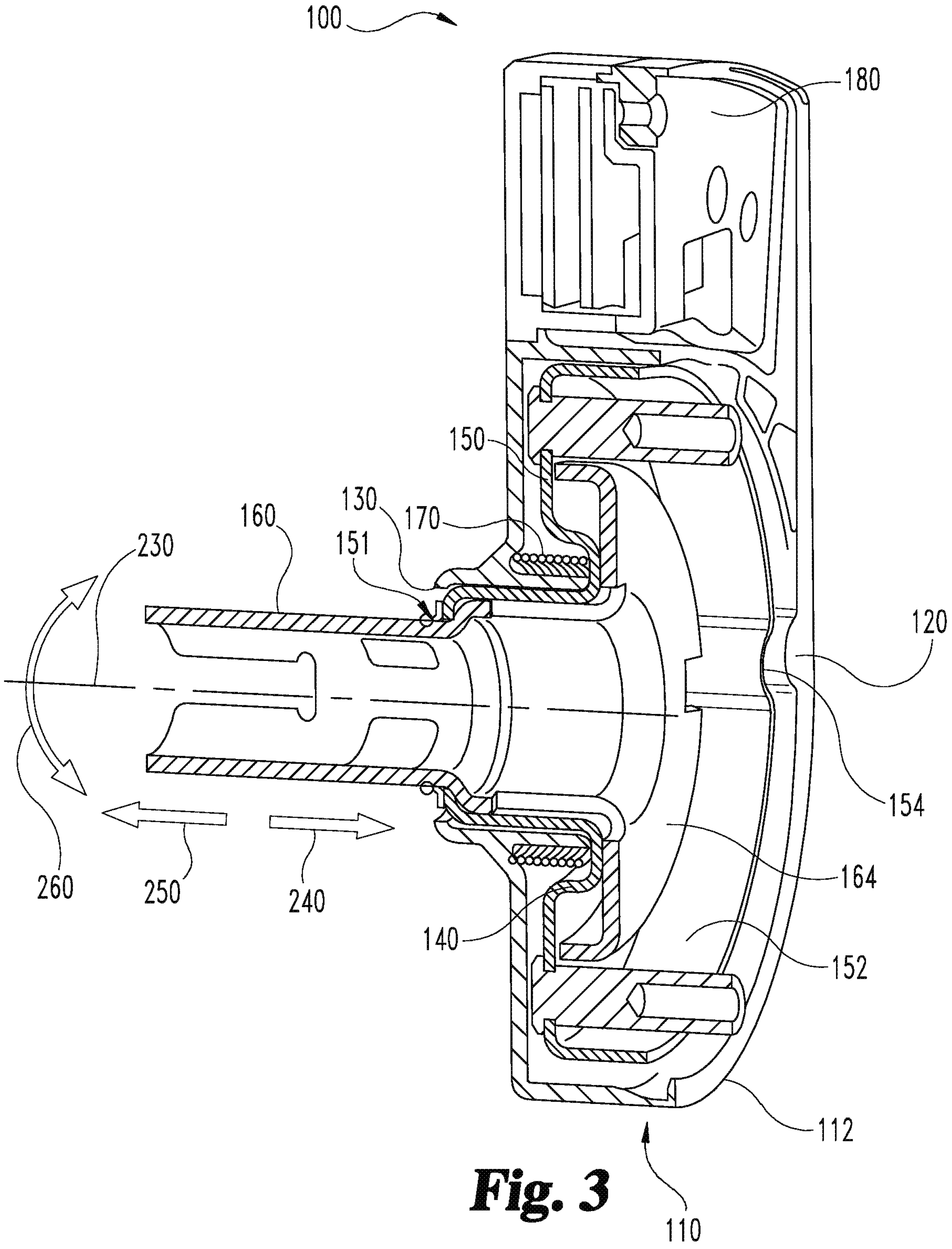
FIG. 3 is a cross-sectional cutaway view of the lever handing apparatus of FIG. 2.

Referring now to FIG. 3, a cross sectional view of the outer escutcheon housing 110, handing spring 170, lever spindle 160 and spring cage housing 140 is shown therein. In this configuration, the handing spring 170 can exert a force on the spring cage housing 140 along an axis 230 in the direction of arrow 240. The spring force urges the spring cage housing 140 to move in the direction of arrow 240 until the recessed receiver portion 154 of the spring cage rim 152 is axially aligned in a first axial position with a corresponding dimple 120 of the escutcheon housing 110. When the outer lever 92 is rotated in a clockwise or counterclockwise direction depicted by double arrow 260 with the spring cage housing 140 in the first position, the lever spindle 160 can freely rotate while the spring cage rim 152 is circumferentially locked relative to the outer rim 112 of the outer escutcheon housing 110.

The lever handing of the lever 92 (shown in FIG. 2) can be changed when the recessed receiver 154 of the spring cage rim 152 is moved to a second axial position out of axial alignment with the dimple 120 of the outer escutcheon housing 110. When a force is exerted through the outer lever 92 in the direction of arrow 250 along the axis 230, the lever spindle 160 will move in the direction of arrow 250 and cause the spring cage rim 152 to also move in the direction 250 through mechanical interaction between the body portion 164 of the lever spindle 160 and the spring cage housing 140. When the spring cage housing 140 has moved to the second position corresponding to an axial distance sufficient to disengage the recessed receiver portion 154 from the dimple 120 then the entire spring cage housing 140 can be rotated in a counterclockwise or clockwise direction with the lever spindle 160 via mechanical abutment and/or a frictional lock with portions of the lever spindle 160. The spring cage housing 140 can be rotated or pivoted approximately 180 degrees from the initial orientation to change the handing position. In this manner the lever arm 210 (shown in FIG. 2) can be changed from a left-handed door to a right-handed door or vice versa as desired. When the force exerted in the direction of arrow 250 is released, the handing spring 170 will urge the spring cage housing 140 in the direction of arrow 240 back to the first position and cause the recessed receiver 154 of spring cage rim 152 to become axially aligned with dimple 120 of the outer escutcheon housing. In the first position, the spring cage rim 152 cannot rotate relative to the outer escutcheon housing 110 and when the outer lever 92 is rotated about the axis of rotation 230 the lever spindle 160 will rotate and cause the latch 80 to open as is conventional.

Figure 4:
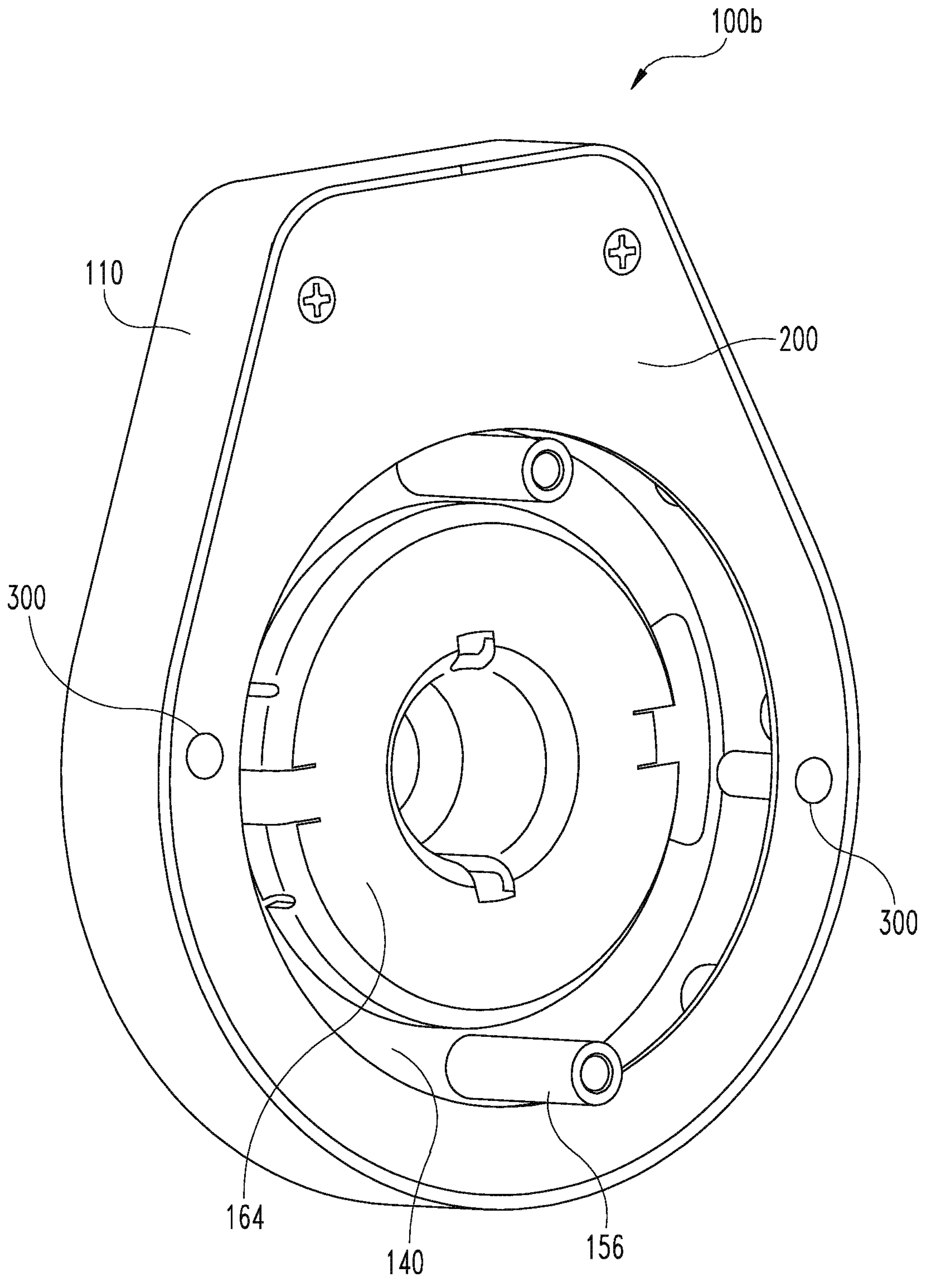
FIG. 4 is an aft perspective view of another embodiment of a lever handing apparatus according to the present disclosure.

Referring now FIG. 4, an alternate embodiment of a lever handing apparatus 100*b* is illustrated therein. Lever handing apparatus 100*b* includes a spring cage housing 140 having one or more pins 300 connected thereto. The one or more pins 300 can selectively project from the spring cage housing 140 through the back plate 200 when the back plate is attached to the outer escutcheon housing 110. When the pins 300 are positioned to extend through the back plate 200, the spring cage housing 140 is prevented from rotating relative to the outer escutcheon housing 110.

Figure 5:
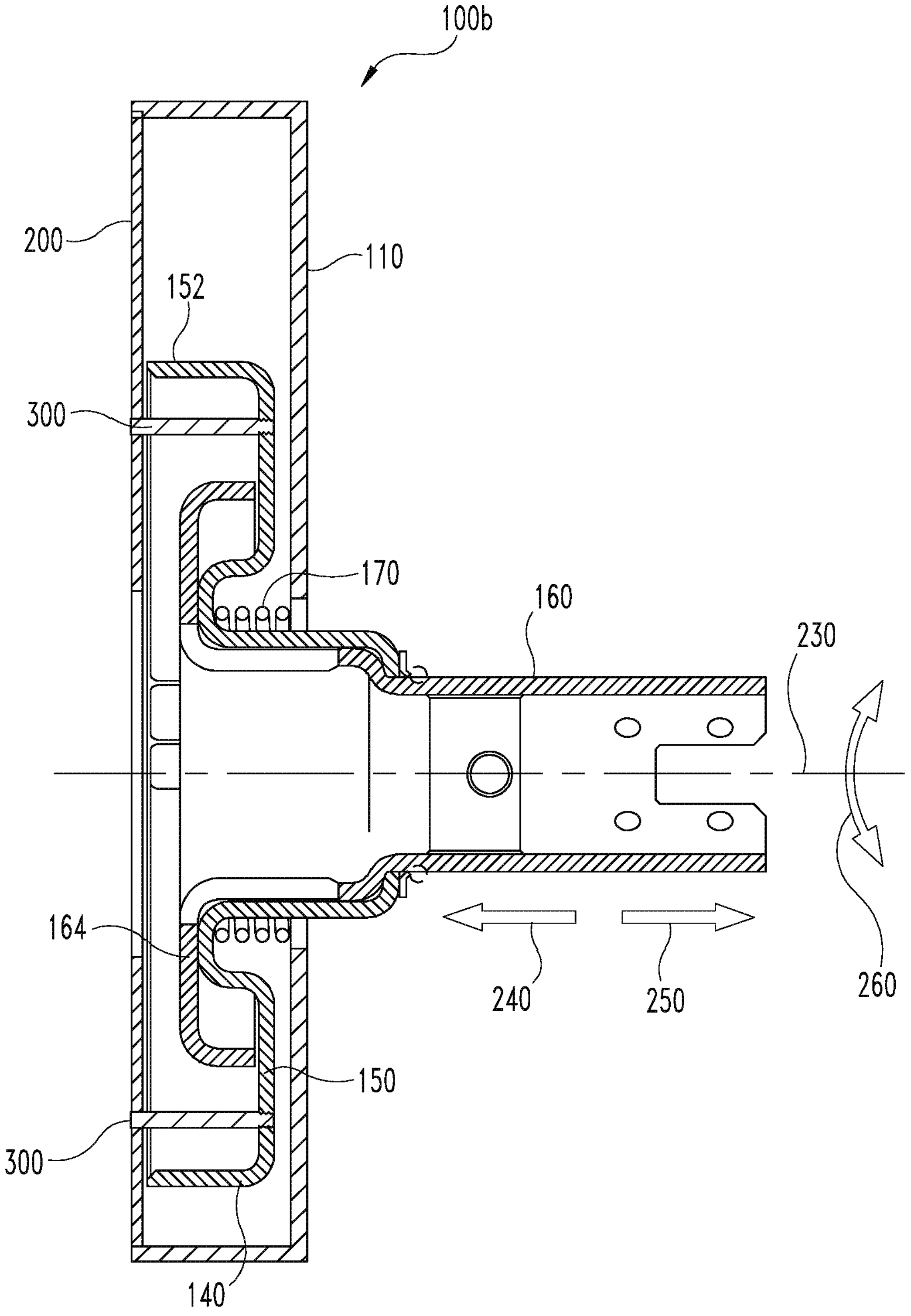
FIG. 5 is a cross-sectional cutaway view the lever handing apparatus of FIG. 4.

FIG. 5 illustrates lever handing apparatus 100*b* in cross-section similar to FIG. 4, but partially rotated out of plane to show the cross section of the pins 300. Each pin 300 can be connected to the spring cage wall 150 in a plurality of configurations. In one form each pin 300 can be releasably connected with the spring cage wall 150 via threaded engagement or the like. In alternative forms each pin 300 can be attached via weld, press fit or integral formation with the spring cage wall 150. The handing spring 170 operates to urge the spring cage housing 140 towards a first position in the direction of arrow 240 along the axis 230 such that each pin 300 is engaged through a portion of the back plate 200. In the first position a portion of each pin 300 extends through the back plate 200 to prevent rotation of the spring cage housing 140 relative to the outer escutcheon housing 110. When an axial force greater than the force of the handing spring 170 is exerted in a direction depicted by arrow 250, the spring cage housing 140 will move to a second position wherein each pin 300 is disengaged from the back plate 200. When the pins 300 are disengaged from the back plate 200, the spring cage housing 140 can freely rotate about the axis 230 as depicted by double arrow 260. The axial movement and the rotational movement of the spring cage housing 140 can be generated through an external force applied to the outer lever 92 (see FIG. 2) such as a force from a user's hand. When the pins 300 are disengaged from the back wall 200 the spring cage housing 140 can be pivoted approximately 180 degrees to change the handing between a left-handed and right-handed configuration as desired. After the spring cage housing 140 is oriented in the desired handed position and the one or more pins 300 are in alignment with corresponding through holes formed in the back plate 200, the outer lever 92 can be released and the handing spring will urge the pins 300 to slidingly engage with the back plate 200 and thus prevent further rotation of the spring cage housing 140 relative to the outer escutcheon housing 110.

Figure 6:
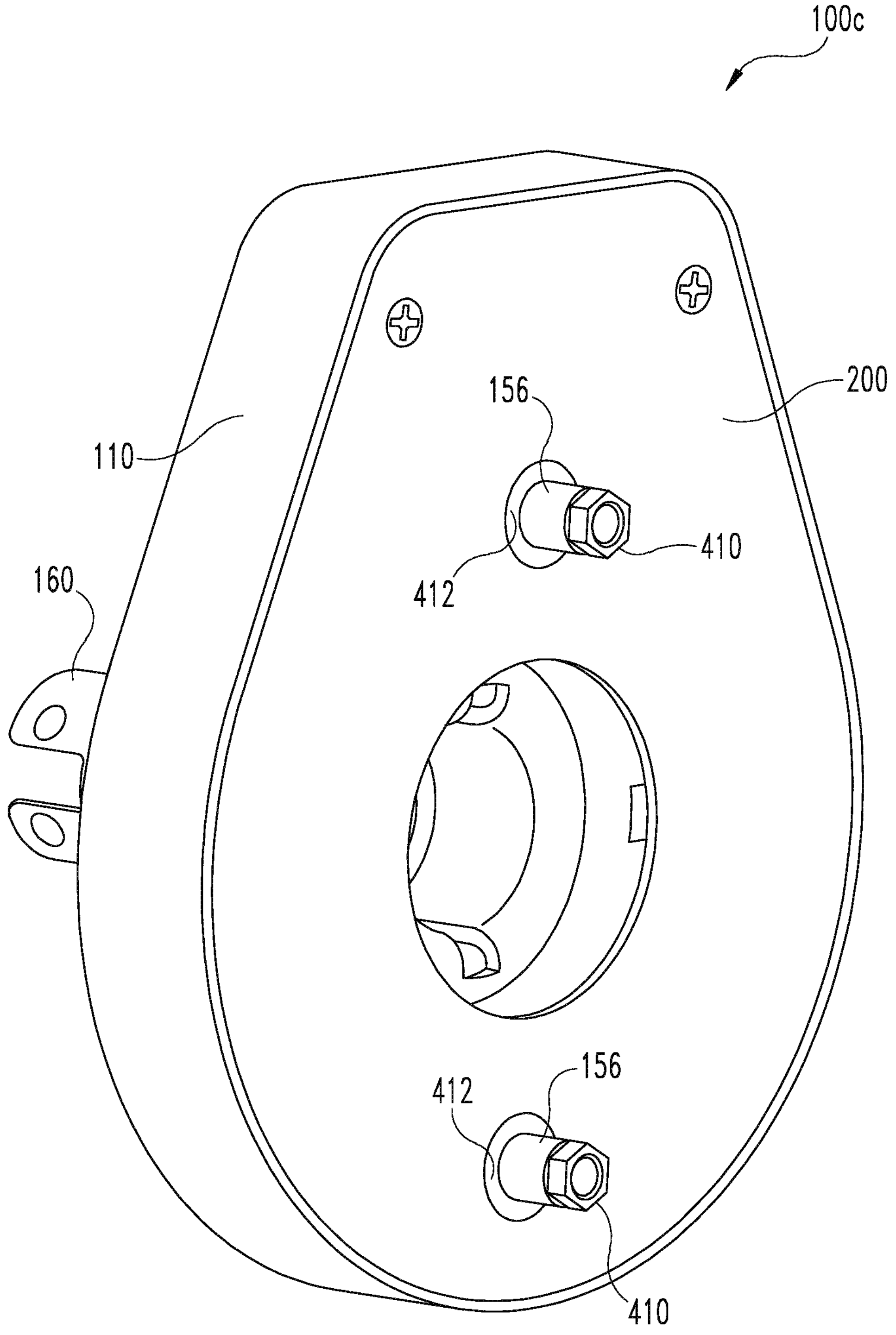
FIG. 6 is an aft perspective view of yet another embodiment of a lever handing apparatus according to the present disclosure.
Figure 7:
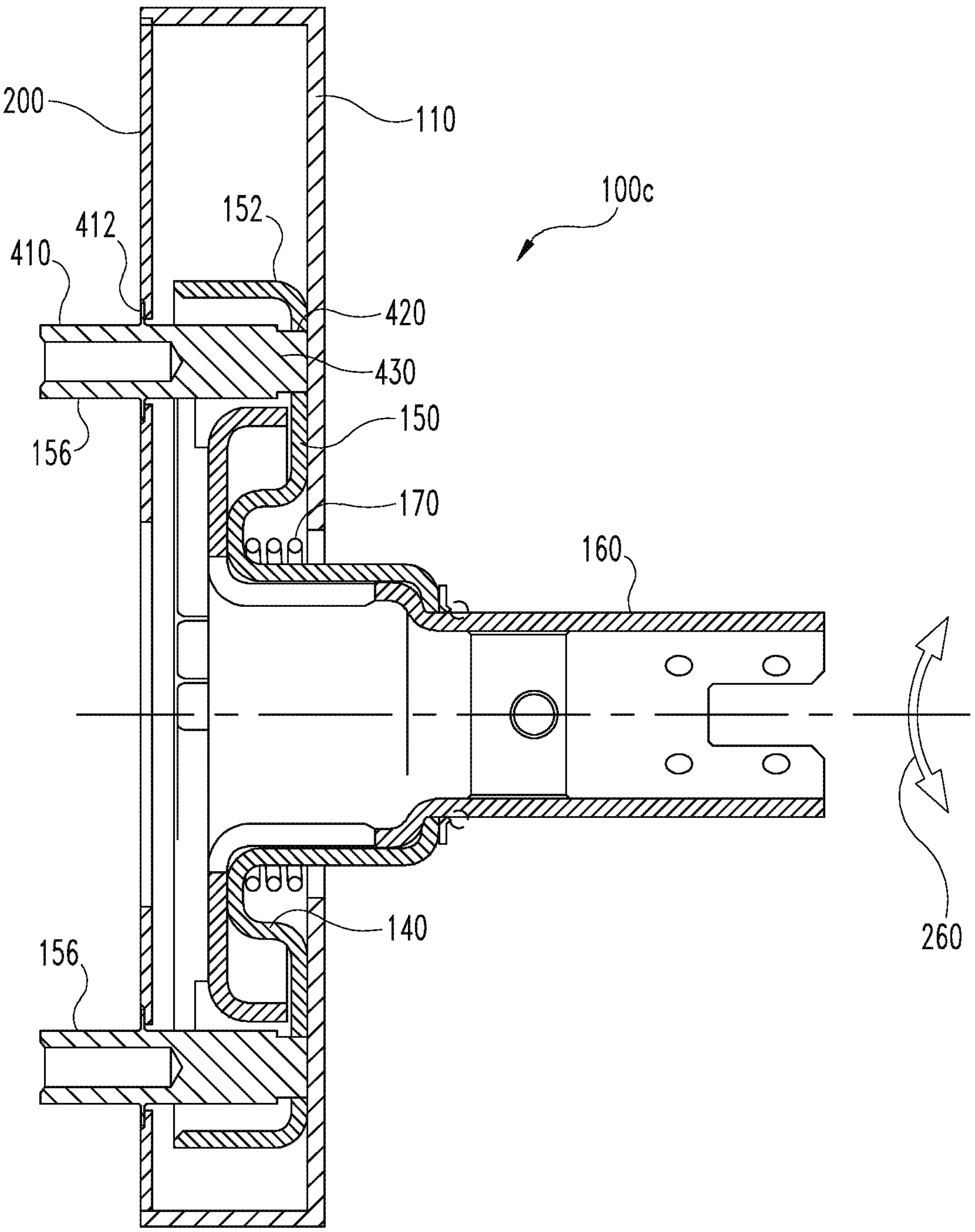
FIG. 7 is a cross-sectional cutaway view of the lever handing apparatus of FIG. 6.

FIGS. 6 and 7 illustrate yet another embodiment of the lever handing apparatus 100*c*. In this form, the spring cage housing 140 can include one or more posts 156 having a threaded shank 430 configured to threadingly engage a threaded receiver 420 formed with the spring cage wall 150. The threaded post 156 can include a hex head 410 or other grip-able features configured to permit a torque to be applied to the threaded post 156. In one form a flange 412 can be integrally formed with the threaded post 156 to engage the back plate 200, however in other forms the threaded posts 156 may not include a flange 412. When the threaded post 156 is installed with the spring cage wall 150 the spring cage housing 140 is prevented from rotating relative to the outer escutcheon housing 110. With the embodiment shown in FIGS. 6 and 7, the handing spring 170 may be optionally employed as the threaded posts 156 are completely removed and not slidingly disengaged with the back plate 200 as with other embodiments of the present disclosure. When the one or more posts 156 are removed from the handing apparatus 100*c*, the spring cage housing 140 can be rotated about the axis 230 in either direction as depicted by double arrow 260. The spring cage housing 140 can be rotated approximately 180 degrees to permit a handing change of the lever 92 between left-hand and right-hand configurations. After the lever 92 is repositioned, the threaded post 156 can be reinserted through the back plate 200 and threadingly engaged with the spring cage wall 150 to prevent further rotation of the spring cage housing 140 relative to the escutcheon housing 110. In one configuration two threaded posts 156 can be used, but in other configurations a single post can be used or alternatively more than two posts can be used. Regardless of the number of threaded posts 156 that are used with the lever handing apparatus 100*c*, threaded receivers 420 formed in the spring cage wall 150 must be positioned so as to align with the post 156 when the lever 92 is in a left hand orientation and at 180 degrees apart in a right hand configuration.

Figure 8:
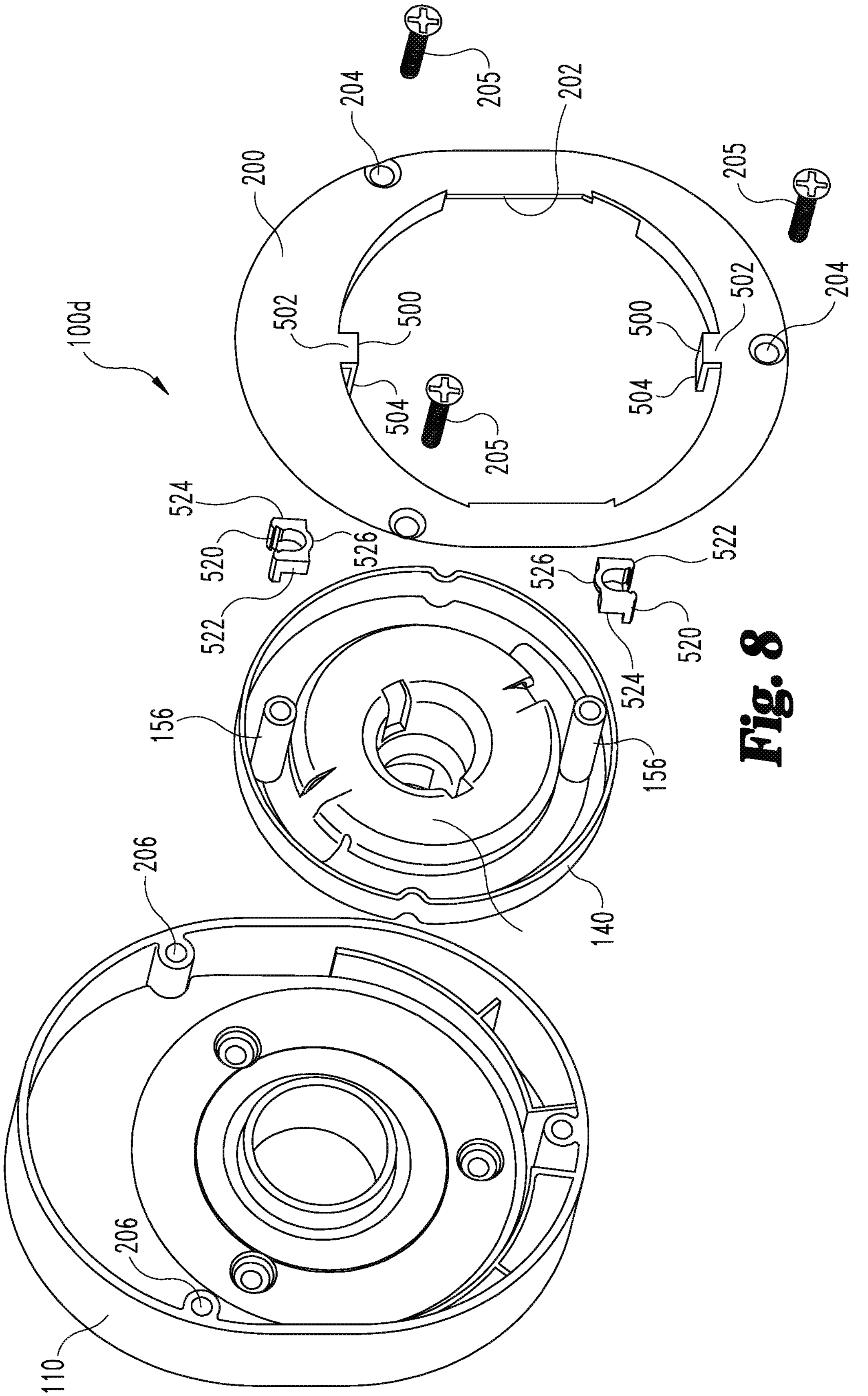
FIG. 8 is an exploded perspective view of yet another embodiment of the lever handing apparatus according to the present disclosure.
Figure 9:
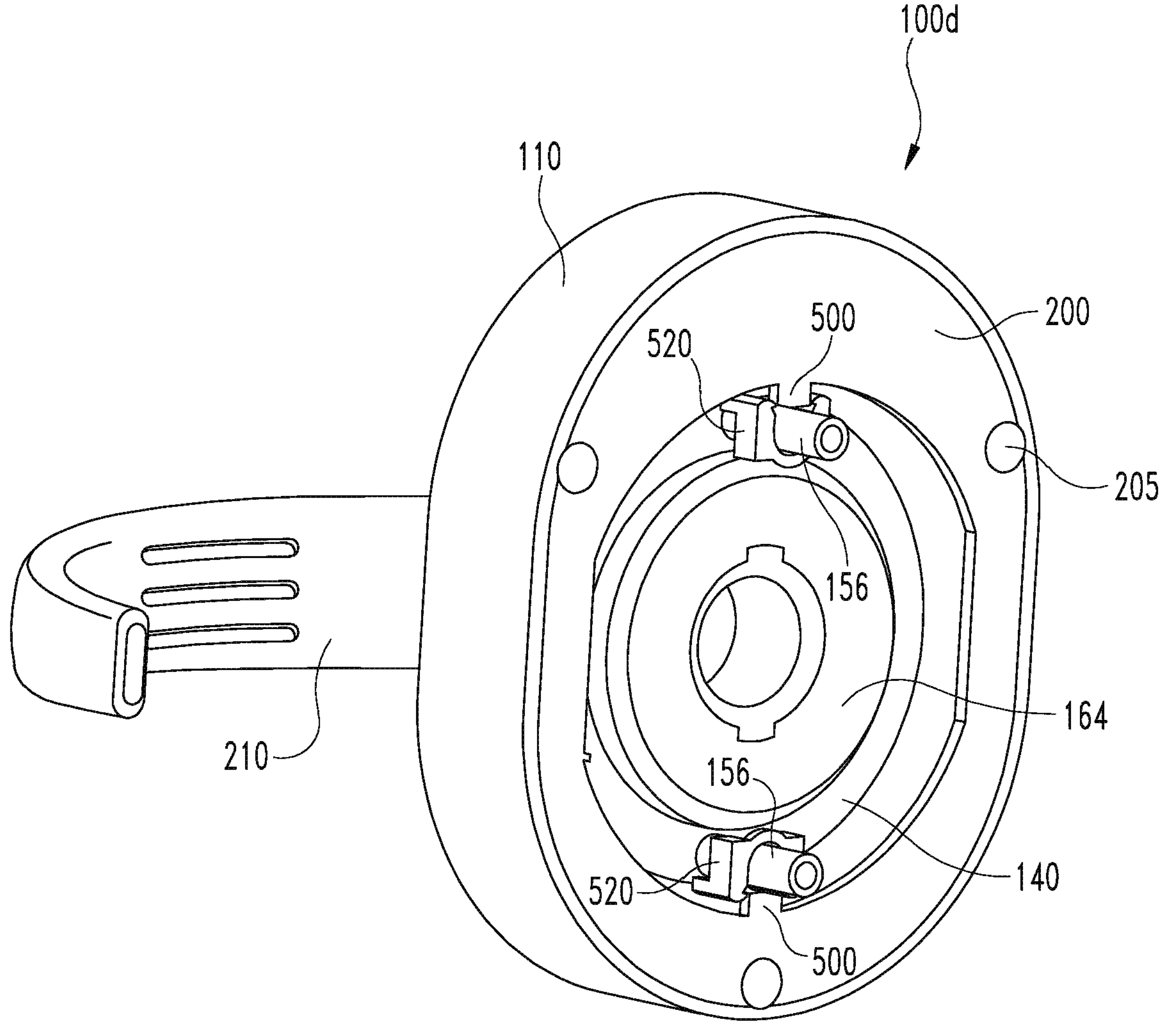
FIG. 9 is an aft perspective view of the lever handing apparatus of FIG. 8 in an assembled configuration.

FIGS. 8 and 9 illustrate yet another embodiment of the lever handing apparatus 100*d*. In this form, the back plate 200 can include one or more tabs 500 projecting radially inward from an inner boundary wall 202. Each tab 500 can include a radial extension 502 and an axial extension 504 projecting from the radial extension 502. Other configurations of tabs 500 as would be known to those skilled in the art can also fall within the teachings of the present disclosure. A substantially U-shaped clip 520 can be used to rotatably lock the spring cage housing 140 to the outer escutcheon housing 110 when the back plate 200 is connected to the escutcheon housing 110. It should be noted that other types or configurations of connecting tabs and removable clips are contemplated by the present disclosure and the U-shaped clip is only one non-limiting example of a removable clip. The back plate 200 can include at least one through hole 204 for a threaded fastener 205 to extend therethrough and threadingly connect with a threaded receiver 206 extending from the outer escutcheon housing 110.

As with other embodiments, one or more posts 156 can be connected to the spring cage housing 140 and project toward the back plate 200 such that each post is radially inward and substantially circumferentially aligned with a corresponding tab 500. The substantially U-shaped clip 520 can include a pair of opposing legs 522 and 524 extending from a base portion 526. The U-shaped clip 520 can be formed from a resilient material such as plastic, metal or composite to name just a few non-limiting examples. Other features such a specific shapes, curves and angular portions can be formed on the U-shaped clip to selectively facilitate a locked connection between the posts 156 of the spring cage housing 140 and the tabs 500 of the back plate 200 as one skilled in the art would readily understand. When the U-shaped clip 520 is positioned such that the base 526 is installed around a corresponding post 156 and the opposing legs 522, 524 extend across a corresponding tab 500 as shown in FIG. 9, the spring cage housing 140 is prevented from rotating relative to the outer escutcheon housing 110.

The lever handing apparatus 100*d* can change handing orientation of the lever arm 210 when the U-shaped clips 520 are removed from an installed condition. The U-shaped clips 520 can be removed by deflecting the legs 522, 524 apart from one another and sliding the base 526 away from the post 156. In some configurations a specialized tool may be used to remove the U-shaped clips 520, however in other embodiments the U-shaped clips 520 may be removed without the aid of any tool. When the substantially U-shaped clips 520 are removed, the spring cage housing 140 can be rotated 180 degrees to change the lever handing orientation. The U-shaped clips 520 can then be reinstalled to prevent further rotation of the spring cage housing 140 relative to the outer escutcheon housing 110 when the lever handle 92 is rotated.

In operation, the lever 92 can be handed (changed between left hand and right hand configurations) in a simplified manner with the lever handing apparatus 100 of the present disclosure. In one embodiment, the lever handle 92 can be pulled outward from a first axial position to a second axial position by a user and then the handle can be rotated or pivoted approximately 180 degrees to change the handle orientation. When the lever handle 92 is pulled outward relative to the door 20, a mechanical abutment between the spring cage housing 140 and the outer escutcheon housing 110 is moved out of circumferential engagement so as to permit rotation of the spring cage housing 140 relative to the escutcheon housing 110. After the spring cage housing 140 has been rotated to a desired position, the handle can be released and the spring member 170 will urge the spring cage housing 140 back to the original first axial position. In the first position, the abutment between the spring cage housing 140 and the escutcheon housing 110 is once again axially positioned to prevent further relative rotation therebetween. Because the lever handle 92 is coupled to the spring cage housing 140, the handle will be repositioned to a left hand or right hand orientation when the spring cage housing 140 has been rotated 180 degrees.

In another embodiment, a removable clip such as a substantially U-shaped clip can circumferentially lock the spring cage housing 140 to the escutcheon housing 110. When the U-shaped clip is removed, the spring cage housing 140 can be rotated 180 degrees to permit a handing change of the lever 92. After the lever 92 has been repositioned, the U-shaped clip can be reinstalled to prevent further relative rotation between the spring cage housing 140 and the escutcheon housing 110. While a U-shaped clip has been illustrated in the disclosed embodiments, it should be understood that other types of fasteners or pins for relative circumferential constraint between the spring cage housing 140 and the escutcheon housing 110 could be used as one skilled in the art would readily understand.

In yet another embodiment, one or more threaded fasteners 156 can extend through the back plate 200 and threadingly engage with the spring cage housing 140 to prevent circumferential movement or rotation relative to the escutcheon housing 110. When the one or more fasteners are removed, the spring cage housing 140 can be rotated 180 degrees to change the lever handing and the threaded fastener(s) 156 can then be reinserted to prevent further relative rotation of the spring cage housing 140.

In one aspect the present disclosure includes a lever handing apparatus comprising: a spring cage housing having a first wall with a through aperture formed therein and an outer rim extending from the first wall; a lever spindle having a body portion with a shaft extending therefrom being positionable through the aperture of the spring cage wall; an escutcheon housing with a front wall extending to a perimeter wall formed around the front wall; an aperture formed through the front wall of the escutcheon housing for receiving a portion of the lever spindle shaft therethrough; a resilient member positioned between the spring cage housing and the escutcheon housing; and wherein the spring cage housing selectively rotatable and movable in an axial direction between a first position and a second position relative to the escutcheon housing.

Refining aspects include a back plate connectable to the escutcheon housing configured to enclose the spring cage housing, the lever spindle and the resilient member therebetween; a lever handle connectable to the lever spindle; wherein the lever spindle is rotatable relative to the spring cage housing; wherein the escutcheon housing includes at least one abutment protruding radially inward from the perimeter wall; wherein the outer rim of the spring cage housing includes at least one recessed portion protruding radially inward and complementary to the at least one abutment of the perimeter wall of the escutcheon housing; wherein the resilient member is operable to urge the spring cage housing into the first position to axially align the at least one recessed portion of the outer rim with the at least one abutment of the perimeter wall; wherein the spring cage housing is prevented from rotating relative to the escutcheon housing in the first position; wherein the at least one recessed portion of the spring cage housing and the at least one abutment of the escutcheon housing are not axially aligned such that the spring cage housing is rotatable relative to the escutcheon housing when the spring cage housing is in the second position; wherein a lever handing is changeable between a left hand and right hand orientation by rotating the spring cage housing approximately 180 degrees when the spring cage housing is in the second position; wherein a force transmitted through the lever spindle urges movement of the spring cage housing toward the second position; wherein at least one pin extending from the spring cage housing toward the back plate; wherein the at least one pin slidingly engages the back plate when the spring cage housing is in the first position and is disengaged from the back plate in the second position; and wherein the engaged pin in the first position prevents rotation of the spring cage housing relative to the escutcheon housing.

Another aspect of the present disclosure includes a lever handing apparatus comprising: a spring cage housing having a first wall with a through aperture formed therein and an outer rim extending from the first wall; a lever spindle having a body portion with a shaft extending therefrom being positionable through the aperture of the spring cage wall; an escutcheon housing with a front wall extending to a perimeter wall formed around the front wall; an aperture formed through the front wall of the escutcheon housing for receiving a portion of the lever spindle shaft therethrough; a back plate having one or more through apertures being connectable to the escutcheon housing; and wherein the spring cage housing is selectively locked to the back plate and is rotatable relative to the escutcheon housing when unlocked.

Another refining aspect includes at least one post projecting from the spring cage housing toward the back plate; at least one tab projecting radially inward from an inner perimeter wall of the back plate; at least one substantially U-shaped clip configured to lock the at least one post and the at least one tab together to prevent rotation of the spring cage housing relative to the escutcheon housing; wherein the spring cage housing is rotatable relative to the escutcheon housing to permit change of lever handing orientation when unlocked; and a resilient member engaged with the spring cage housing.

Another aspect of the present disclosure includes a lever handing apparatus comprising: a spring cage housing having a first wall with a through aperture formed therein and an outer rim extending from the first wall; a lever spindle having a body portion with a shaft extending therefrom being positionable through the aperture of the spring cage wall; an escutcheon housing with a front wall extending to a perimeter wall formed around the front wall; an aperture formed through the front wall of the escutcheon housing for receiving a portion of the lever spindle shaft therethrough; a back plate connectable to the escutcheon housing; and at least one threaded fastener extendable through the back plate to threadingly engage with the spring cage housing and rotatably lock the spring cage housing relative to the escutcheon housing.

Another refining aspect includes an apparatus wherein the spring cage housing is rotatable to change the lever handing between a left hand orientation and a right hand orientation when the at least one threaded fastener is removed.

Another aspect of the present disclosure includes a method comprising: gripping a lever handle; pulling the lever handle in first axial direction along an axis of rotation; moving a spring cage housing in the first axial direction from a first position to a second position with respect to an escutcheon housing in response to the pulling; rotating the lever handle approximately 180 degrees to change a lever handing orientation; urging the spring cage to move in a second axial direction from the second position to the first position; and locking the spring cage housing with respect to the escutcheon housing with an abutment to prevent relative rotation between the spring cage housing and the escutcheon housing.

Another refining aspect includes a method wherein the locking includes at least one recessed portion projecting radially inward from an outer rim of the spring cage housing and at least one protrusion projecting radially inward from the perimeter wall of the escutcheon housing; and wherein the locking includes at least one pin projecting from the spring cage assembly to selectively engage with a back plate coupled with the escutcheon housing.

It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as “a,” “an,” “at least one” and “at least a portion” are used, there is no intention to limit the claim to only one item unless specifically stated to the contrary in the claim. Further, when the language “at least a portion” and/or “a portion” is used the item may include a portion and/or the entire item unless specifically stated to the contrary.

What is claimed is:

1. A lockset, comprising:

a latch assembly;

a housing assembly;

a lever handle movably mounted to the housing assembly for rotational movement about a rotational axis and for axial movement along the rotational axis, wherein the lever handle is operably connected with the latch assembly; and a lever handing assembly operable to selectively provide the lever handle in each of a first handing orientation and a second handing orientation different from the first handing orientation;

wherein axial movement of the lever handle along the rotational axis from a first position to a second position moves the lever handing assembly from an engaged condition to a disengaged condition;

wherein, with the lever handing assembly in the engaged condition, the lever handle is provided in one of the first handing orientation or the second handing orientation; and wherein, with the lever handing assembly in the disengaged condition, the lever handle is movable between the first handing orientation and the second handing orientation.

2. The lockset of claim 1, wherein the lever handing assembly comprises:

a spring cage housing comprising a first engagement feature; and a spindle rotatably mounted to the spring cage housing;

wherein the housing assembly comprises a second engagement feature operable to engage the first engagement feature;

wherein, with the lever handing assembly in the engaged condition and the lever handle in the first handing orientation, the first engagement feature and the second engagement feature are engaged with one another to prevent rotation of the spring cage housing relative to the housing assembly about the rotational axis; and wherein, with the lever handing assembly in the disengaged condition, the first engagement feature and the second engagement feature are disengaged from one another to permit rotation of the spring cage housing relative to the housing assembly about the rotational axis.

3. The lockset of claim 2, wherein the housing assembly further comprises a third engagement feature operable to engage the first engagement feature;

wherein, with the lever handing assembly in the engaged condition and the lever handle in the second handing orientation, the first engagement feature and the third engagement feature are engaged with one another to prevent rotation of the spring cage housing relative to the housing assembly about the rotational axis; and wherein, with the lever handing assembly in the disengaged condition, the first engagement feature and the third engagement feature are disengaged from one another to permit rotation of the spring cage housing relative to the housing assembly about the rotational axis.

4. A lockset, comprising:

a housing assembly;

a spring cage housing movably mounted to the housing assembly, wherein the spring cage housing is movable relative to the housing assembly along a rotational axis between an engaged position and a disengaged position; and a spindle rotatably mounted to the spring cage housing for rotation about the rotational axis and axially coupled with the spring cage housing for joint movement with the spring cage housing along the rotational axis;

wherein, with the spring cage housing in the engaged position, the spring cage housing is rotationally coupled with the housing assembly;

wherein, with the spring cage housing in the disengaged position, the spring cage housing is rotatable relative to the housing assembly between a first handing orientation and a second handing orientation; and wherein the spring cage housing is configured to move between the engaged position and the disengaged position in response to joint axial movement of the spindle and the spring cage housing along the rotational axis.

5. The lockset of claim 4, further comprising an abutment and a recess;

wherein the abutment is engaged with the recess when the spring cage housing is in the engaged position and the spring cage housing is in the first handing orientation; and wherein the abutment is disengaged from the recess when the spring cage housing is in the disengaged position.

6. The lockset of claim 5, further comprising a second abutment;

wherein the second abutment is engaged with the recess when the spring cage housing is in the engaged position and the spring cage housing is in the second handing orientation; and wherein the second abutment is disengaged from the recess when the spring cage housing is in the disengaged position.

7. The lockset of claim 5, wherein one of the housing assembly or the spring cage housing comprises the abutment; and wherein the other of the housing assembly or the spring cage housing comprises the recess.

8. The lockset of claim 6, wherein the housing assembly comprises the abutment.

9. The lockset of claim 8, wherein an escutcheon housing of the housing assembly comprises the abutment.

10. The lockset of claim 4, further comprising a resilient member biasing the spring cage housing toward the engaged position.

11. The lockset of claim 10, wherein the housing assembly comprises an escutcheon housing and a back plate; and wherein the resilient member is engaged between the spring cage housing and the back plate.

12. The lockset of claim 4, further comprising:

a latch assembly operably connected with the spindle such that the latch assembly is actuated by rotation of the spindle about the rotational axis when the spring cage housing is in the engaged position; and a lever handle mounted to the spindle such that the lever handle is operable to rotate the spindle about the rotational axis.

13. A lockset, comprising:

a housing assembly;

a spring cage housing movably mounted to the housing assembly for movement between an engaged position and a disengaged position; and a spindle rotatably mounted to the spring cage housing for rotation about a rotational axis;

wherein the spring cage housing is configured to move between the engaged position and the disengaged position in response to axial movement of the spindle along the rotational axis;

wherein one of the housing assembly or the spring cage housing comprises a first engagement feature;

wherein the other of the housing assembly or the spring cage housing comprises a second engagement feature and a third engagement feature;

wherein, with the spring cage housing in the disengaged position, the first engagement feature is disengaged from each of the second engagement feature and the third engagement feature, and the spring cage housing is rotatable relative to the housing assembly about the rotational axis between a first handing orientation and a second handing orientation different from the first handing orientation;

wherein, with the spring cage housing in the engaged position and the first handing orientation, the first engagement feature and the second engagement feature are engaged with one another to prevent rotation of the spring cage housing relative to the housing assembly about the rotational axis; and wherein, with the spring cage housing in the engaged position and the second handing orientation, the first engagement feature and the third engagement feature are engaged with one another to prevent rotation of the spring cage housing relative to the housing assembly about the rotational axis.

14. The lockset of claim 13, further comprising a resilient member biasing the spring cage housing toward the engaged position.

15. The lockset of claim 13, wherein the first engagement feature comprises one of an abutment or a recess; and wherein the second engagement feature and the third engagement feature each comprises the other of the abutment or the recess.

16. The lockset of claim 13, wherein the first engagement feature comprises one of a post or an aperture; and wherein each of the second engagement feature and the third engagement feature comprises the other of the post or the aperture.

17. The lockset of claim 13, wherein the housing assembly comprises the first engagement feature; and wherein the spring cage housing comprises the second engagement feature and the third engagement feature.

18. The trim assembly of claim 17, wherein the first engagement feature is formed on an inner periphery of the housing assembly; and wherein each of the second engagement feature and the third engagement feature is formed on an outer periphery of the spring cage housing.

19. The lockset of claim 13, further comprising:

a latch assembly operably connected with the spindle such that the latch assembly is actuated by rotation of the spindle about the rotational axis when the spring cage housing is in the engaged position; and a lever handle mounted to the spindle such that the lever handle is operable to rotate the spindle about the rotational axis.

* * * * *